(12) United States Patent
Grosse-Puppendahl et al.

(10) Patent No.: US 10,198,233 B2
(45) Date of Patent: Feb. 5, 2019

(54) UPDATING DISPLAYS BASED ON ATTENTION TRACKING DATA

(71) Applicant: Microsoft Technology Licensing, LLC, Redmond, WA (US)

(72) Inventors: Tobias Alexander Grosse-Puppendahl, Cambridge (GB); James Scott, Cambridge (GB); Stephen Edward Hodges, Cambridge (GB); John Franciscus Marie Helmes, Steyl (NL); Stuart Alastair Taylor, Cambridge (GB); Nicholas Yen-Cherng Chen, Cambridge (GB); Pascal Knierim, Munich (DE); Gavin Wood, Newcastle Upon Tyne (GB); Josh Fromm, Seattle, WA (US); Albrecht Schmidt, Satteldorf (DE)

(73) Assignee: Microsoft Technology Licensing, LLC, Redmond, WA (US)

(*) Notice: Subject to any disclaimer, the term of this patent is extended or adjusted under 35 U.S.C. 154(b) by 185 days.

(21) Appl. No.: 15/058,012

(22) Filed: Mar. 1, 2016

(65) Prior Publication Data

US 2017/0255439 A1 Sep. 7, 2017

(51) Int. Cl.
*G06F 3/14* (2006.01)
*G06F 3/01* (2006.01)
*G06F 3/0481* (2013.01)
*G06Q 10/10* (2012.01)
*H04N 21/488* (2011.01)

(52) U.S. Cl.
CPC ............ *G06F 3/1407* (2013.01); *G06F 3/012* (2013.01); *G06F 3/013* (2013.01); *G06F 3/0481* (2013.01); *G06Q 10/10* (2013.01); *H04N 21/4882* (2013.01)

(58) Field of Classification Search
CPC ... G06Q 10/10; G06F 3/1407; H04N 21/4882
See application file for complete search history.

(56) References Cited

U.S. PATENT DOCUMENTS

| | | |
|---|---|---|
| 6,971,072 B1 | 11/2005 | Stein |
| 8,612,855 B2 | 12/2013 | Greenspan et al. |
| 8,672,482 B2 * | 3/2014 | Vertegaal ............... G06F 3/011 351/209 |

(Continued)

OTHER PUBLICATIONS

Zhong, "Energy-Effcient Mobile System Design: The User's Perspective," In Doctoral Dissertation, Sep. 2005, 184 pages.*

(Continued)

*Primary Examiner* — Samantha (Yuehan) Wang
*Assistant Examiner* — Michael Le
(74) *Attorney, Agent, or Firm* — Schwegman Lundberg & Woessner, P.A.

(57) ABSTRACT

A system is described which comprises an input arranged to receive attention tracking data from attention tracking hardware. The attention tracking data, along with parameters associated with each display change request, is then used to select a display change request from a plurality of stored display change requests received from a plurality of different applications and a change defined by the selected display change request is then rendered in a GUI on a display device.

20 Claims, 7 Drawing Sheets

(56) References Cited

U.S. PATENT DOCUMENTS

| | | | |
|---|---|---|---|
| 8,957,847 B1* | 2/2015 | Karakotsios | G06F 3/013 345/156 |
| 2009/0007168 A1 | 1/2009 | Finamore | |
| 2012/0092248 A1 | 4/2012 | Prabhala | |
| 2013/0222371 A1 | 8/2013 | Reitan | |
| 2013/0321265 A1* | 12/2013 | Bychkov | G06F 3/013 345/156 |
| 2013/0321270 A1* | 12/2013 | Bjorklund | G06F 3/013 345/158 |
| 2014/0062853 A1 | 3/2014 | Chaudhri et al. | |
| 2015/0153570 A1 | 6/2015 | Yamamoto et al. | |
| 2015/0172236 A1 | 6/2015 | Meijer et al. | |
| 2015/0348513 A1 | 12/2015 | Grimme et al. | |
| 2016/0306502 A1* | 10/2016 | Ramadge | G06F 3/04817 |

OTHER PUBLICATIONS

Kumar, "Gaze-Enhanced User Interface Design," In Doctoral Dissertation, May 2007, 164 pages.*

Luo, "Designing Energy and User Efficient Interactions with Mobile Systems," In PhD Thesis of CMU-ISR-08-102, Apr. 2008, 119 pages.

Maghazeh et al., "Perception-Aware Power Management for Mobile Games via Dynamic Resolution Scaling," In Proceedings of the IEEE/ACM International Conference on Computer-Aided Design, Nov. 2, 2015, pp. 613-620.

"International Application Serial No. PCT/US2017/019233, International Search Report dated May 8, 2017", 4 pgs.

"International Application Serial No. PCT/US2017/019233, Written Opinion dated May 8, 2017", 9 pgs.

* cited by examiner

UPDATING DISPLAYS BASED ON ATTENTION TRACKING DATA

BACKGROUND

The amount of information displayed on a typical computing screen can result in important changes in the information going unnoticed by a user and/or unimportant changes distracting a user.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A system is described which comprises an input arranged to receive attention tracking data from attention tracking hardware. The attention tracking data, along with parameters associated with each display change request is then used to select a display change request from a plurality of stored display change requests received from a plurality of different applications and a change defined by the selected display change request is then rendered in a graphical user interface (GUI) on a display device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The embodiments described below are not limited to implementations which solve any or all of the disadvantages of known display systems.

Described herein is a system that acts as an interface between a display device and a number of applications which may provide updated information for rendering on the display device. Each item of updated information received by the system from an application (for rendering on the display device) is referred to herein as a 'display change request' (DCR) and may have a number of associated parameters that are specified by the application that generates (or submits) the DCR. Then, based on the output of a attention tracking system and the parameters associated with each pending DCR, selects a DCR and renders the change on the display device.

The attention tracking system may track a user's focus of attention using any suitable technology. The attention tracking system may, for example, track a position of the user's focus of attention (e.g. it may be a gaze tracking system) and/or a user's position relative to a display device (e.g. where the display device is a very large display). Alternatively, other techniques for determining a user's focus (e.g. relying upon a brain-computer interface) may be used.

The updated information (or change) to which a DCR relates may be any update to the rendering of an application's graphical user interface (GUI). Examples include, but are not limited to, a notification that a new email or meeting request has been received, a change in time of an existing meeting (i.e. a meeting which is already in a user's calendar), a reminder, a news alert, any other notification from an application (e.g. an update to a leaderboard for a computer game or a notification of availability of a shared resource), an updated rendering of an email folder (e.g. inbox), calendar, shared editing environment (e.g. to highlight changes made by another user) or weather application, a change to system-wide display settings (e.g. contrast), etc.

The parameters associated with a DCR relate to when and/or in what way the DCR is to be displayed and may also define whether a user acknowledgement of the change is required. The parameters may, optionally, also define a priority for the display change. For example, the parameters may determine whether the rendering of the change can be delayed or not and may also define a time window in which the change must be rendered (e.g. the parameters may specify that a change can be delayed but must be rendered before next Tuesday at 2 pm, or can be delayed but must be rendered within 24 hours). The parameters may, in addition or instead, define whether the change should be rendered in a way that is less likely to be noticed by a user or in a way that is very likely to be noticed by a user or in a way that the transition from the original information to the new information is visible to the user. The parameters may also define whether a user acknowledgement of the change is required.

By using a system as described herein that collects DCRs from multiple applications, the rendering of the changes can be coordinated and software and hardware can be shared between applications. This may reduce energy consumption (e.g. by grouping changes that can be rendered at the same time, thus reducing the number of display updates and/or by allowing applications to be suspended until a change is rendered or acknowledged), save memory or at least optimize memory use (e.g. by allowing applications to be removed from memory altogether or at least until a change has been rendered or acknowledged and/or by using a single store for storing DCRs), increase accessibility (e.g. by grouping changes that can be rendered at the same time, thus reducing the number of display updates and/or spacing out display updates for users that require additional time to notice or interpret a change), increase the lifespan of a persistent display (e.g. as a consequence of reducing the number of display updates) and/or reduce user distraction (e.g. by only rendering in a very visible manner those changes that have a parameter which indicates that they should be rendered in a manner that is highly noticeable by the user). Where energy consumption is reduced, this in turn may extend the operating time of battery powered devices and/or enable smaller form factor devices (e.g. as a smaller capacity battery can be used).

FIGS. 1-5 show schematic diagrams of six different systems 100, 200, 300, 400, 510, 540 that each comprise a attention tracking system (comprising a hardware component 102 and a software component 104), a memory for storing DCRs (DCR store 106) and a display change control module 108 (which although it is shown as implemented in software in FIGS. 1-5 may alternatively be implemented in hardware). The operation of the systems 100, 200, 300, 400, 510, 540 and in particular the operation of the display change control module 108, when implemented in hardware, or the operation of the processor 116 when executing the instructions in the display change control module 108, when implemented in software, can be described with reference to FIG. 6.

Although the display change module 108 is described below as being implemented in software, alternatively, or in addition, the functionality described herein may be performed, at least in part, by one or more hardware logic components. For example, and without limitation, illustrative types of hardware logic components that are optionally used include Field-programmable Gate Arrays (FPGAs), Application-specific integrated Circuits (ASICs), Application-specific Standard Products (ASSPs), System-on-a-chip systems (SOCs), Complex Programmable Logic Devices (CPLDs), Graphics Processing Units (GPUs).

Figure 1:
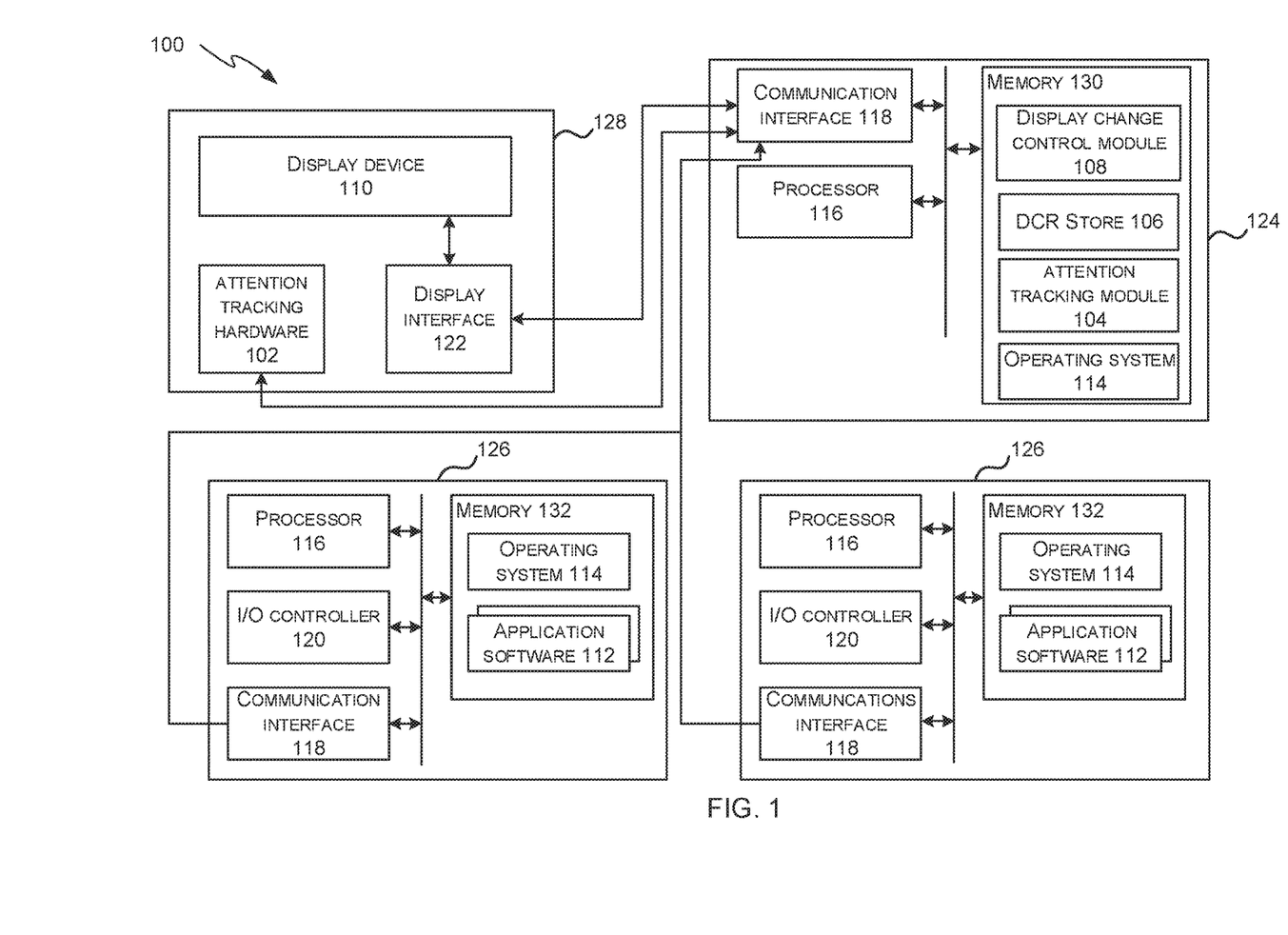
FIG. 1 shows a schematic diagram of a first example system comprising a attention tracking system, a memory for storing display change requests and a display change control module.

The system 100 shown in FIG. 1 comprises a first computing device 124, one or more additional computing devices 126 and a separate display system 128. In this system 100, the first computing device 124 comprises the display change control module 108, DCR store 106 and attention tracking software component (or module) 104 and an additional computing device 126 runs the applications which generate the DCRs. The attention tracking hardware 102 is part of the separate display system 128. In the system 200 shown in FIG. 2, the display system 128 is part of the first computing device 124 and in the system 300 shown in FIG. 3, the display system 128 is part of (or connected to) an additional computing device 126 and there may be a display system 128 integrated into (or connected directly to) each additional computing device 126. In the system 300 shown in FIG. 3, the attention tracking hardware 102 is part of the display system 128 which is integrated into (or connected directly to) each additional computing device 126 and the attention tracking software 104 runs on a separate computing device 124 which comprises the display change control module 108. In a variation on the system 300, the attention tracking software 104 may be co-located with the attention tracking hardware 102 (i.e. such that it runs on each additional computing device 126). The system 400 shown in FIG. 4 comprises a single computing device 402. In this system 400, the single computing device 402 comprises the display change module 408, DCR store 106 and attention tracking system (both hardware 102 and software 104) and also runs the applications which generate the DCRs. The two systems 510, 540 shown in FIG. 5 are variations on the systems 100, 400 shown in FIGS. 1 and 4 with the difference that the attention tracking hardware 102 is a separate device.

The first computing device 124 (in any of systems 100, 200, 300, 510) comprises a processor 116, memory 130 and communication interface 118. The processor 116 is arranged to execute device-executable instructions which may be stored in the memory 130 and which, in the example shown, include the display change control module 108, the attention tracking module 104 (which is the software component of the attention tracking system) and an operating system 114. Although the display change control module 108 and the attention tracking module 104 are shown separately from the operating system 114, in various examples, one or both of these modules 108, 104 may be integrated into the operating system 114 running on this first computing device 124. The memory 130 is also arranged to store the DCRs and hence contains the DCR store 106.

An additional computing device 126 (in any of systems 100, 200, 300, 510) comprises a processor 116, memory 132, a communication interface 118 and an input/output controller 120. The processor 116 is arranged to execute device-executable instructions which may be stored in the memory 130 and which, in the example shown, include an operating system 114 and application software 112 (which is software for one or more applications). At least one of these applications 112 generates DCRs which are transmitted to the first computing device 124 via the communication interfaces 118. The applications 112 may be user applications (i.e. which provide output to a user and/or receive inputs from a user) and user inputs may be received from a user input device (not shown) via the input/output controller 120. These additional computing devices 126 may therefore be referred to as 'user computing devices' and may, for example, be laptop computers, tablet computers, smart phones, games consoles, etc.

Although the computing devices 124, 126 (in any of systems 100, 200, 300, 510) are described and shown as comprising an operating system 114 within which other software (e.g. application software 112) runs, it will be appreciated that in various examples, a computing device may not comprise an operating system (e.g. where the processor 116 is a microcontroller that executes specific software).

The display system 128 (in any of systems 100, 200, 300, 400) comprises a display device 110 and attention tracking hardware 102. In contrast, in the systems shown in FIG. 5, the attention tracking hardware 102 is separate from the display device 110. In various examples, the attention tracking hardware 102 may be associated with a particular user (for example, it may be a wearable device that is worn by the user) and may be used with various different display devices 110 depending upon which display device a user is currently physically close to.

The display device 110, in any of the systems 100, 200, 300, 400, 510, 540, may comprise a single display screen (e.g. a single LCD, LED, OLED or persistent display) or multiple display screens on which the DCRs may be rendered. The display device 110 (in any of systems 100, 200, 300, 400, 510, 540) may, for example, be a shared display (e.g. a large shared display) and may be a situated display (i.e. a display in a fixed location). A situated display may be large (e.g. installed on an internal or external wall) or small (e.g. a shelf edge label), have any shape, and may be in a public location (e.g. in the street) or a private location (e.g. in a home). A situated display may integrate seamlessly into the environment (e.g. it may look like part of the wall into which it is integrated) and its primary modality is not interaction (e.g. unlike a PC monitor).

The attention tracking hardware 102 (or a part of the attention tracking hardware 102), in any of the systems 100, 200, 300, 400, 510, 540, is physically close to the display device 110 when in use (e.g. within the same room, street, etc. or within line of sight of the display device 110) to enable the attention tracking module 104 (in the first computing device 124) to determine a user's attention position relative to the display device 110 (e.g. relative to each of the one or more display screens within the display device 110). In determining a user's attention position (e.g. gaze location) relative to the display device 110, the attention tracking system does not need to be 100% confident that the identified position is accurate and so the attention position identified may be considered to be a likely attention position and the level of confidence of this determination that is required may vary according to the actual implementation (e.g. some systems may only identify an attention position if its position is known to a very high confidence and other systems may identify a more approximate attention position). In various examples, the attention tracking hardware 102 (or part thereof) is co-located with the display device 110 e.g. it may be positioned adjacent to one or each of the display screens. In other examples, as shown in FIG. 5, however, it may be a separate device which is physically close and able to communicate with the attention tracking software 104.

In various examples, the attention tracking system (comprising the hardware 102 and software 104) may work at one of a number of different levels of granularity. At a coarse level, the attention tracking system may determine whether the user's eyes are facing towards or away from the display device 110 (and from this it can hence be inferred that the display is perceivable to the user). At a finer level, the attention tracking system may determine whether a user's eyes are following moving information on the display (this may be perceived without requiring user-specific calibration). At very fine levels, calibration may be required and so such levels may be more suited to some systems (e.g. whether the display system 128 is in a user's device) than others (e.g. where the display system 128 is a shared resource). At a very fine level, the attention tracking system may determine whether a user's eyes are focused on information on the display device 110.

The attention tracking hardware 102 (and a attention tracking system comprising both the hardware 102 and the software 104) in any of the systems 100, 200, 300, 400, 510, 540 may use any suitable technology for determining a user's attention location and may track a user's gaze. Example methods for determining a direction of a user's gaze (and hence a position on a display screen that a user's is looking at) include video-based eye tracking which may use visible or infrared light and where this is used, the attention tracking hardware 102 comprises one or more cameras. The attention tracking module 104 may, for example, use feature-based methods (that rely upon local features of the eye and/or features of the user's face) and/or appearance-based methods (that track the eyes based on the photometric appearance). Where the attention tracking hardware 102 comprises one or more cameras, these may be dedicated cameras (i.e. which are used for attention tracking only) or they may be general or multi-purpose cameras which provide images (or other data) to the attention tracking module 104 but which may also be used to capture images for other purposes (e.g. as a general purpose camera used by a user to take photographs in the system 300 shown in FIG. 3). In other examples, the attention tracking hardware 102 may comprise sensors (e.g. capacitive sensors) in a user's glasses and these may be used to determine a user's gaze direction.

In the system 100 shown in FIG. 1, the display system 128 additionally includes a display interface 122 that is arranged to receive display data for rendering on the display from the separate, and possibly remote, first computing device 124. Although this display interface 122 is not shown in the system 200 shown in FIG. 2, the system 200 may still include such an interface or any required interface functionality may be performed by the processor 116 or other element in the first computing device 124. The display interface is also not shown in the system 300 in FIG. 3 and again, the system 300 may stilt include such an interface or any required interface functionality may be performed by the processor 116 or other element in the additional computing device 126.

Figure 2:
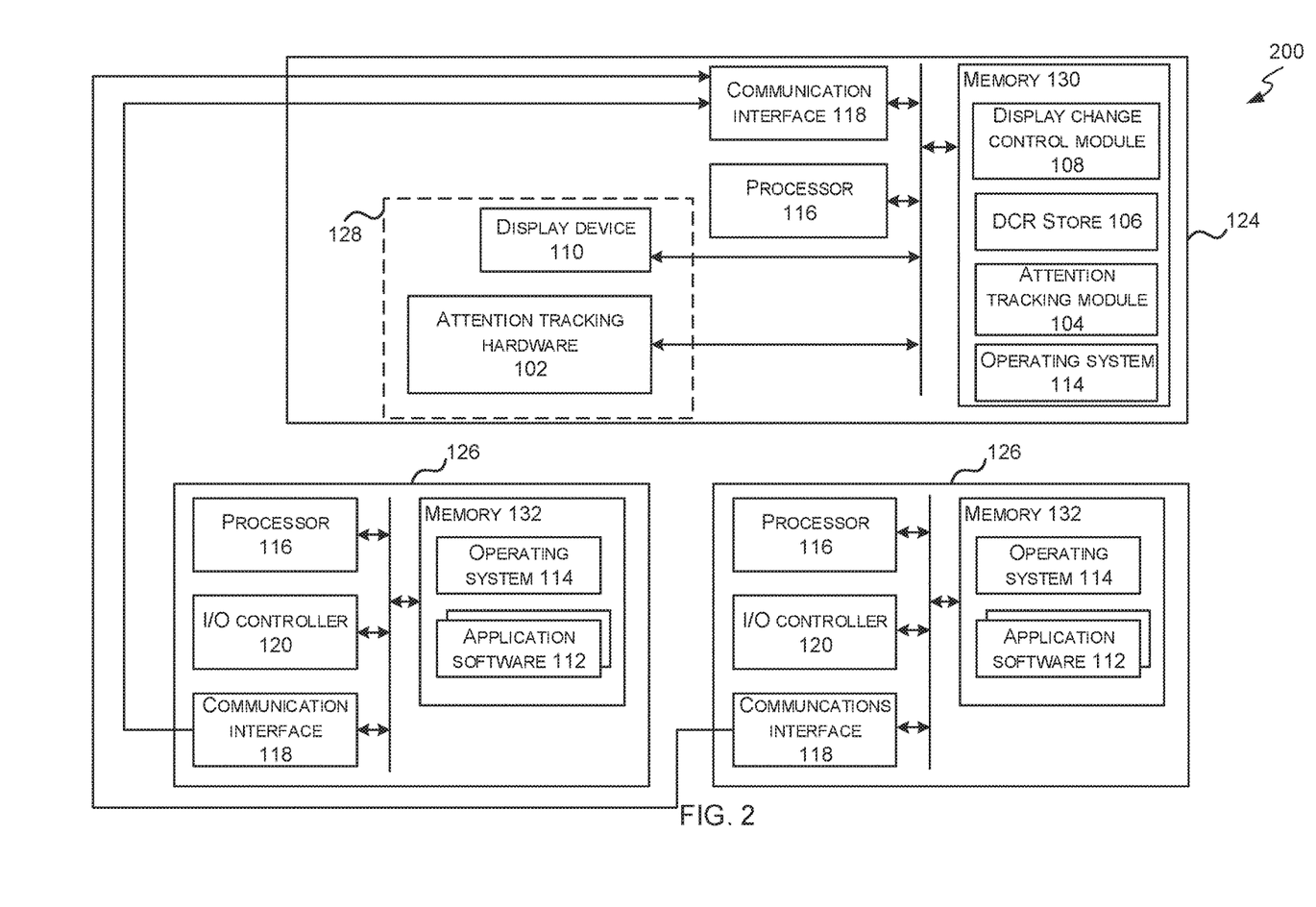
FIG. 2 shows a schematic diagram of a second example system comprising a attention tracking system, a memory for storing display change requests and a display change control module.
Figure 3:
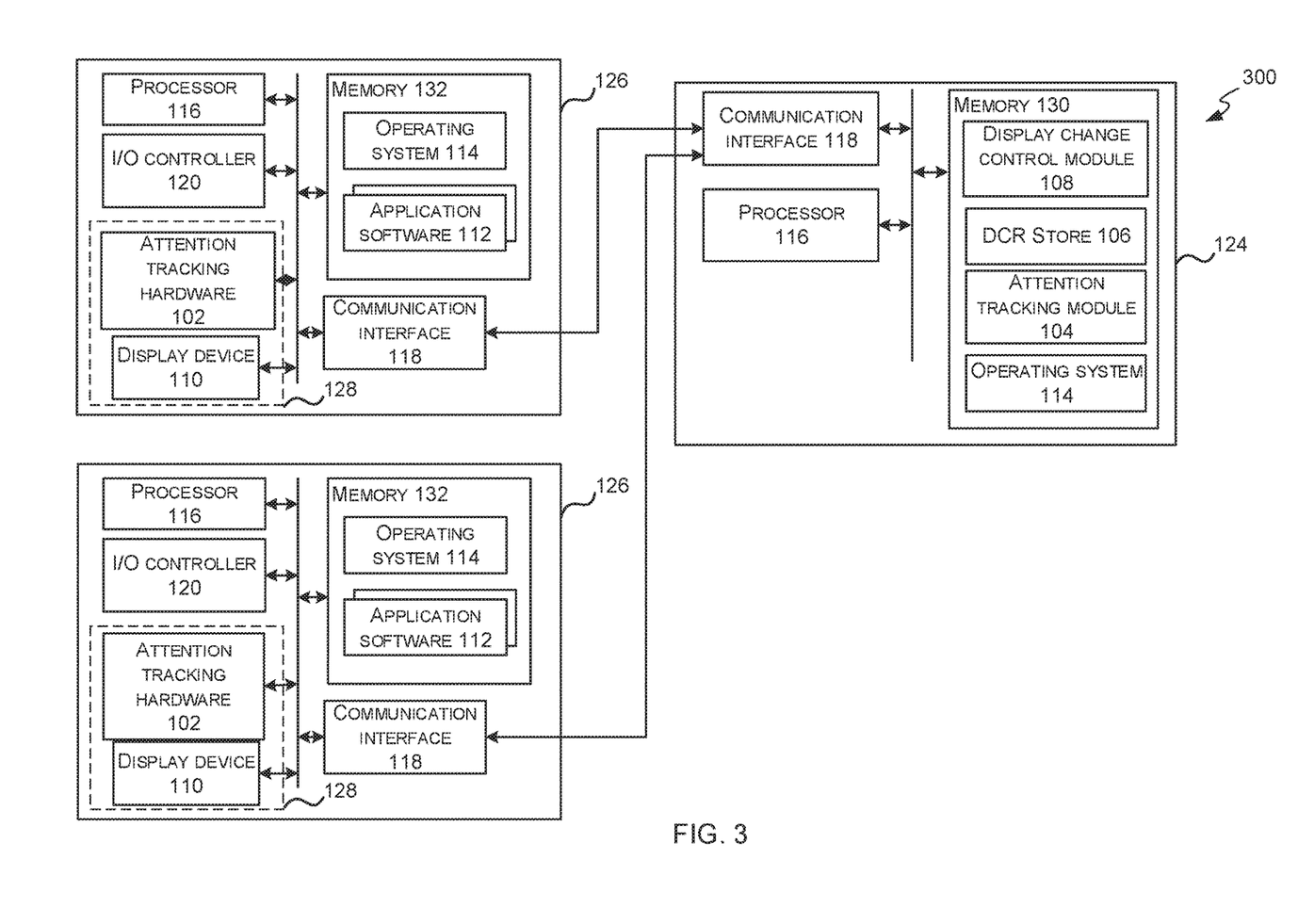
FIG. 3 shows a schematic diagram of a third example system comprising a attention tracking system, a memory for storing display change requests and a display change control module.

In the systems 100, 200, 300 shown in FIGS. 1-3, the display change control module 108 runs on the first computing device 124 which is separate from the user computing devices 126 running the applications which generate some or all of the DCRs. This first computing device 124 which runs the display change control module 108 may, for example, be located in a data center and may be remote from both the computing devices 126 on which the applications 112 are running that generate the DCRs and in the systems 100, 300 shown in FIGS. 1 and 3 it may also be remote from the display system 128 on which the display changes are rendered. Alternatively, the first computing device 124 may be situated close to the display system 128 or, as shown in FIG. 2, the display system 128 may be integrated within the first computing device 124.

Figure 4:
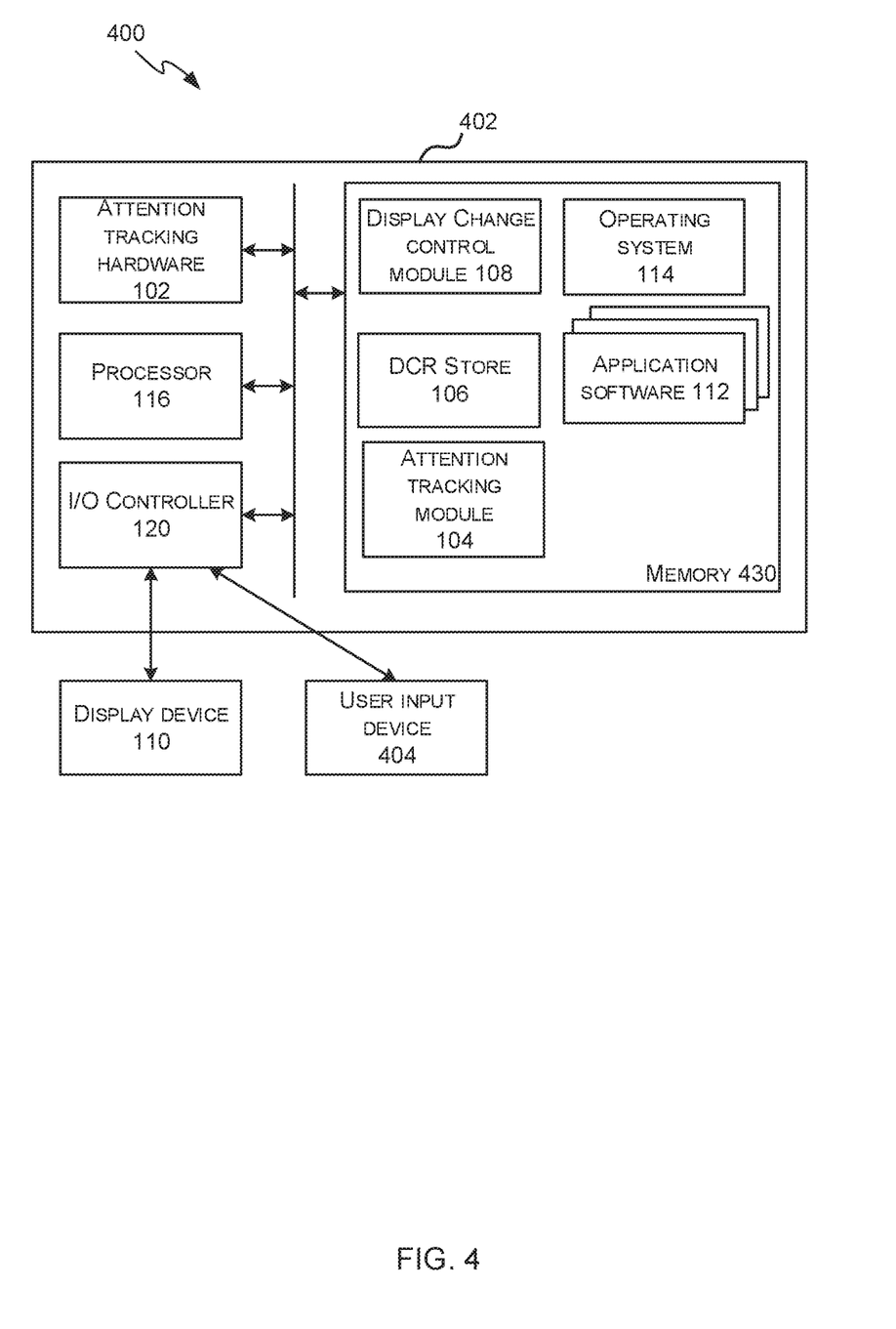
FIG. 4 shows a schematic diagram of a fourth example system comprising a attention tracking system, a memory for storing display change requests and a display change control module.
Figure 5:
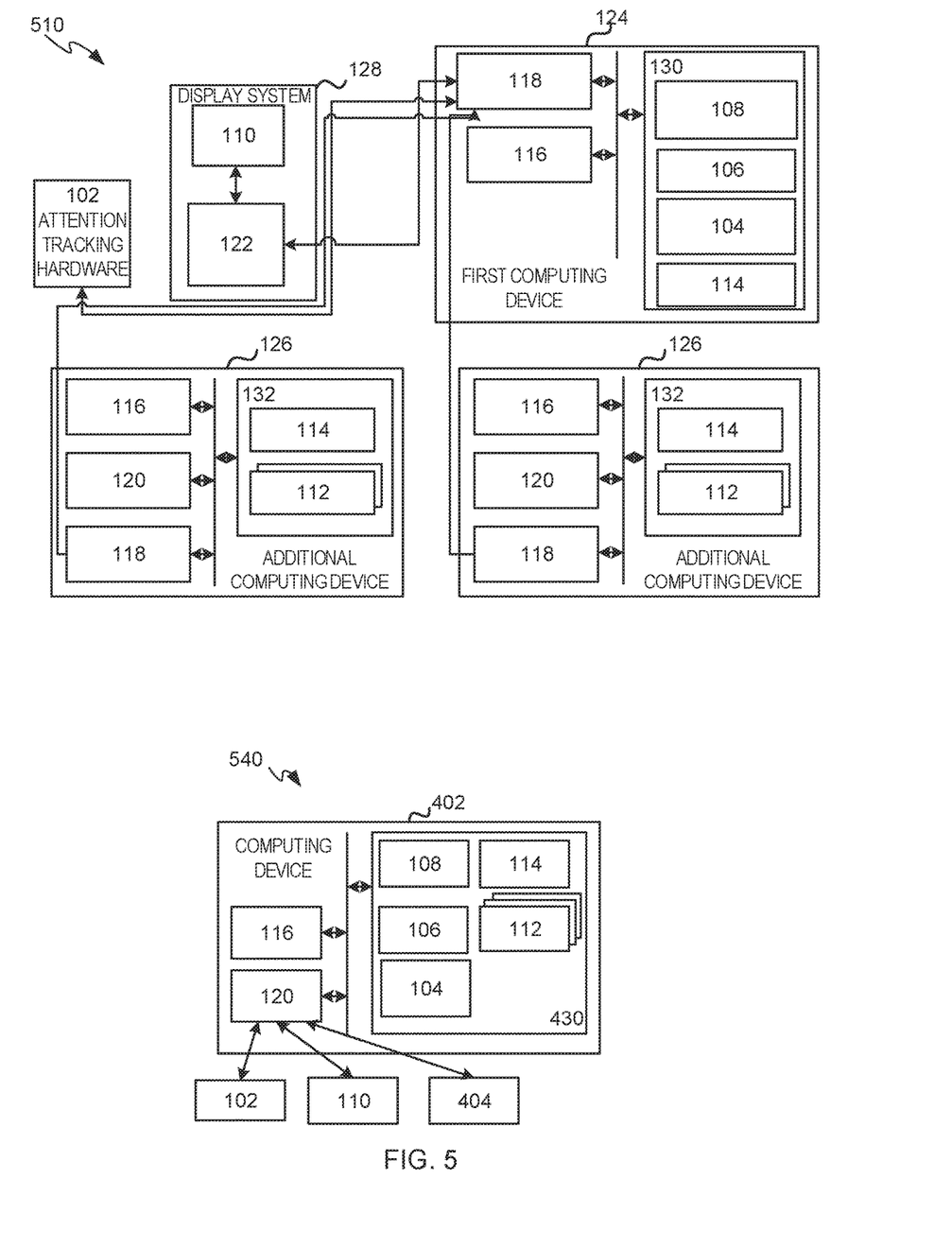
FIG. 5 show schematic diagrams of two further example systems, each comprising a attention tracking system, a memory for storing display change requests and a display change control module.

In contrast to the systems 100, 200, 300 shown in FIGS. 1-3, in system 400 shown in FIG. 4, the display change control module 108 runs on the same computing device (computing device 402) as the applications 112 that generate the DCRs. Although the display change control module 108 and the attention tracking module 104 are shown separately from the operating system 114, in various examples, one or both of these modules 108, 104 may be integrated into the operating system 114 running on this single computing device 402. The memory 430 which stores the operating system 114, display change control module 108 and attention tracking module 104 is also arranged to store the DCRs and hence contains the DCR store 106. The single computing device 402 in FIG. 4 further comprises a processor 116 and an input/output controller 120. The processor 116 is arranged to execute device-executable instructions which may be stored in the memory 430 and which, in the example shown, include the display change control module 108, the attention tracking module 104, the operating system 114 and the application software 112. One or more of these applications 112 (and in various examples, two or more of the applications 112) generate DCRs which are received by the display change control module 108 and stored in the DCR store 106. The applications 112 may be user applications (i.e. which provide output to a user and/or receive inputs from a user) and user inputs may be received from a user input device 404 via the input/output controller 120. This single computing device 402 may therefore be referred to as a 'user computing device' and may, for example, be a laptop computer, tablet computer, smart phone or games console, etc.

In the systems 100, 200, 300 shown in FIGS. 1-3, the attention tracking hardware 102 is shown as part of the display system 128. In other example systems, however, the attention tracking hardware 102 may be a separate device which can communicate with the computing device comprising the attention tracking module 104 and two examples are shown in FIG. 5. The first example system 510 is similar to the system 100 shown in FIG. 1, except that the attention tracking hardware 102 is a separate device and the second example system 540 is similar to the system 400 shown in FIG. 4, except that the attention tracking hardware 102 is a separate device. Further example systems (not shown in FIG. 5) may be similar to the systems 200, 300 shown in FIGS. 2 and 3 except that the attention tracking hardware 102 is a separate device.

The display change control module 108 (in any of systems 100, 200, 300, 400, 510, 540) may be described as providing a centralized functionality hence be referred to as a centralized display change control module) because, when the instructions are executed by the processor 116, they enable the processor to centrally manage DCRs from a plurality of applications 112 which may be running on one or more other computing devices 126 or on the same computing device 402. As noted above, this coordinated, central handling of DCRs may reduce energy consumption, save memory or at least optimize memory use, increase accessibility and/or reduce user distraction.

Coordinated, central handling of DCRs as described herein also means that each application does not need to include attention tracking software or software to interpret attention tracking data and determine whether to make a change or not. This results in less complex (and potentially smaller) applications (which may save memory). Furthermore, each application does not need access to attention tracking data which may be sensitive personal data and instead the attention tracking data may only be accessible by a single component (the display change control module 108) which may be trusted. This improves data security (e.g. particularly where some of the applications come from untrusted and/or third party sources).

The functionality provided by the display change control module 108 (in any of systems 100, 200, 300, 400, 510, 540) may be described with reference to FIG. 6. In the examples shown in FIGS. 1-5 the display change control module 108 is implemented in software and so comprises device-executable instructions which when executed by a processor 116 cause the processor to perform the method of FIG. 6. Alternatively, as described above, some or all of the functionality of the display change module 108 (e.g. as shown in FIG. 6) may be implemented in hardware.

Figure 6:
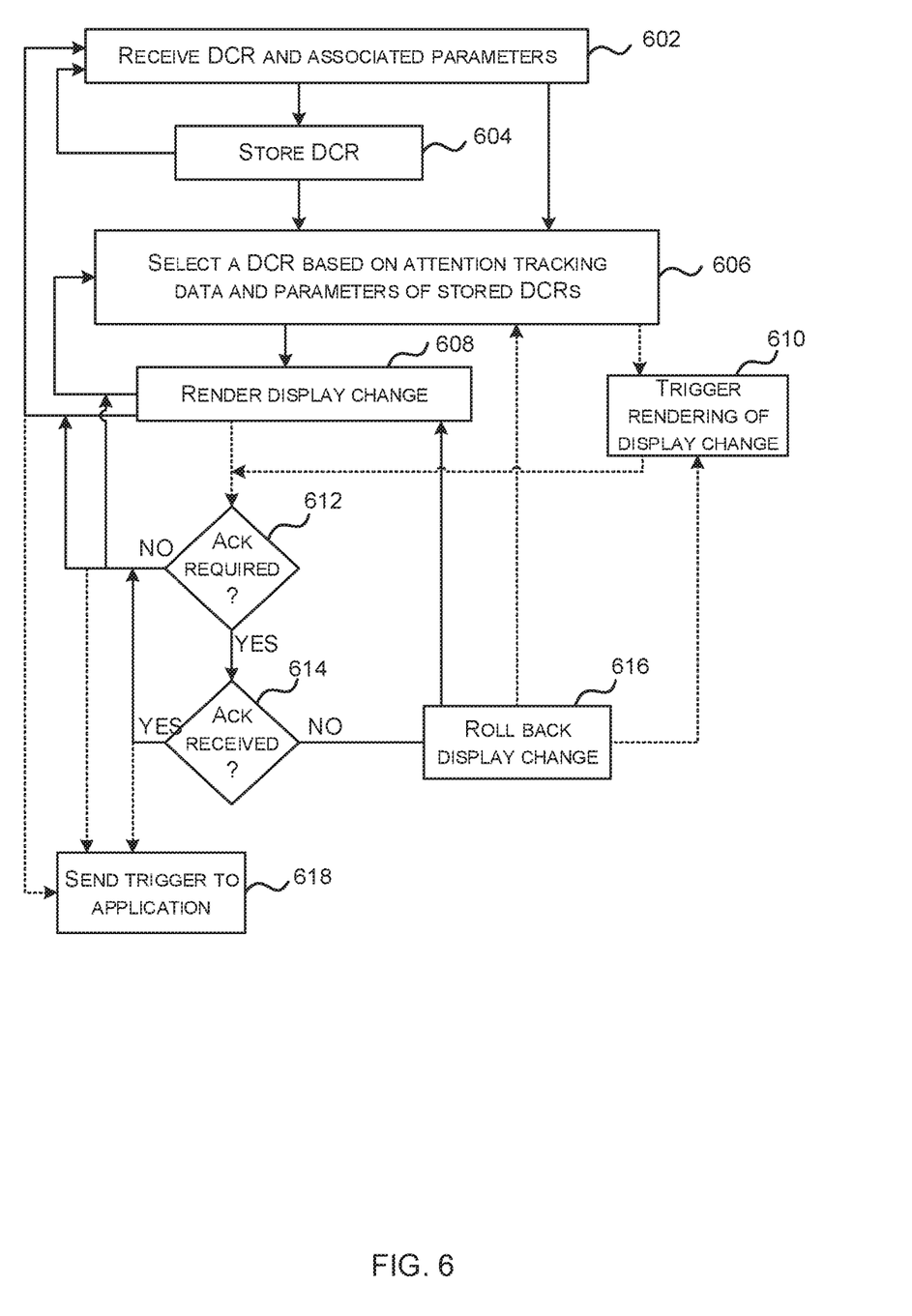
FIG. 6 is a flow diagram of an example method of operation of the display change module of any of FIGS. 1-5.

As shown in FIG. 6, when a DCR and its associated parameters are received (block 602), any DCR which is not actioned immediately may be stored in the DCR store 106 (block 604). The DCRs stored in the DCR store 106 may be referred to as 'pending DCRs' because they relate to display changes that have been requested (by an application 112) but that have not yet been rendered or, where they require an acknowledgement by a user, have not yet been acknowledged (but may have been rendered). The use of a single, centralized DCR store 106 for all applications may save memory or at least optimize memory use. In various examples not all DCRs will be stored (e.g. those DCRs that relate to display changes that are rendered immediately upon receipt may not be stored) and/or some DCRs may only be stored very briefly.

The parameters associated with a DCR are those parameters which are generated along with the DCR by an application and which relate to when and/or in what way the DCR is to be displayed and may also define whether a user acknowledgement of the change is required (and optionally may also define a priority level). In an example, the parameters may comprise a number of flags or tags which indicate whether the display change can be delayed or not, whether the change should be rendered in a noticeable manner or in a change-blind manner, whether the change should be rendered such that the user can see the change occur (i.e. see the transition from the before to the after state) and/or whether a user acknowledgement of the change is required. Use of these parameters may, therefore, reduce energy consumption, increase accessibility, reduce user distraction (e.g. by enabling display changes to be grouped, thus reducing the number of display updates) and/or provide a guarantee that a user saw an important change to information (which may increase efficiency because further notifications are not required). In various examples, parameters may define which users the change is to be displayed to and/or which users the change cannot be displayed to (e.g. for shared displays or displays in shared spaces where multiple users may be viewing, or at least able to see, the display device 110 at the same time). Use of such parameters may increase security of data.

Further examples of parameters which may be used include a parameter which indicates that an animated display change should be used (e.g. using inversion of colors, appearance of symbols, flashing of a region of the display or whole display, phosphor widgets as described at http://patrickbaudisch.com/projects/phosphor/index.html, etc.) and/or a parameter which indicates that an update indicator should be used (e.g. by augmenting an area where a change has occurred to make the change more obvious, for example by using a chrome or highlighted surface finish, flashing of a region of the display or whole display, etc.).

A stored DCR is then selected from the DCRs in the DCR store 106 based on data identifying a user's attention location and on the parameters of the stored DCRs (block 606). Depending on where the software component 104 of the attention tracking system is implemented, the user's attention location may be determined locally (e.g. by the same processor based on attention tracking data received from attention tracking hardware 102 which may be part of the same computing device or part of a separate display system 128) or the user's attention location may be determined by another computing device.

Various different heuristics may be used to select the DCR (in block 606). For example, where a DCR is flagged as not being able to be delayed, it may be selected at a first opportunity (e.g. substantially immediately upon receipt of the DCR). Where a DCR is flagged as requiring a user to be able to notice the change (and, optionally, also see the transition between the before and after states of the GUI), the DCR may not be selected until the attention tracking data indicates that the user is looking at the display device 110 and, depending upon the granularity of the attention tracking data, until the attention tracking data indicates that the user is looking at a particular region in the GUI rendered on the display device 110. Similarly, where a DCR is flagged to be implemented in a change-blind manner (i.e. such that the chance that the user notices the change is minimized), the DCR may not be selected until the attention tracking data indicates that the user is not looking at the display device 110 or, depending upon the granularity of the attention tracking data, until the attention tracking data indicates that the user is not looking at a particular region in the GUI where the change is to be rendered.

In various examples, and in particular for displays which require significantly more power to update the display compared to displaying a static image (e.g. persistent displays), the display changes may be grouped to minimize the frequency with which the display is updated and hence reduce power consumption.

In addition to attention tracking data, the selection block 606) may also be based on user identity data, such that a change is only displayed to a particular user (or group of users) and/or is not displayed if a particular user is present, where the user identity constraints may be specified within the DCR parameters (as described above). This may increase security of data.

In various examples, the selection (in block 606) may be additionally based on other parameters (in addition to the attention tracking data and optionally user identity data) and examples include, but are not limited to, time of day or day of the week, calendar data for a user, etc. For example, if a user works from home, changes relating to their work may be delayed any only rendering during a user's working hours (e.g. to improve a user's work/life balance) and/or changes relating to their personal life may be delayed and only rendered outside of the user's working hours. In another example, changes relating to one project that a user is working on may be delayed if they are currently actively working on another project (e.g. as determined by which files a user has open and/or is currently interacting with) and this may increase the efficiency of the user. In a further example, a situated display may only update at particular times of day (e.g. noon each day).

In various examples, the selection (in block 606) may be additionally based on what other DCRs are pending, such that a DCR is only selected when a specific group of DCRs are ready for display. This may enable changes to be displayed in a synchronized manner (e.g. across applications or for a single application) and/or enable update of only a region of the display device 110 (e.g. for persistent displays, where this may reduce the power consumption).

Once a stored DCR has been selected (in block 606), the display change may then be rendered (block 608) or, for systems where the display device 110 is separate from the display change control module 108, a signal may be sent to the display system 128 triggering the rendering of the display change (block 610).

In a system which comprises multiple display systems 128 (e.g. system 100 with multiple display systems 128 and/or system 300) and/or a system where the display device 110 comprises multiple screens, as welt as selecting a DCR based on the attention tracking data (in block 606), the display screen/system on which the display change is to be rendered may also be selected (also in block 606) based on both the attention tracking data and the parameters of the selected DCR. These different display screens/systems may be in different locations (e.g. in different rooms or buildings), different positions within the same location (e.g. on different walls in a room) and/or integrated into different computing devices (e.g. as in the system 300 shown in FIG. 3).

For example, where there are three display screens (which may be part of the same display system 128 or part of different display systems), a DCR which is flagged to be change-blind may be displayed on a display screen which a user is not currently looking at (as determined based on the attention tracking data). In another example, where a DCR is flagged as requiring a user to be able to notice the change, the DCR may displayed on a display screen that the user is currently looking at (as determined based on the attention tracking data).

Figure 7:
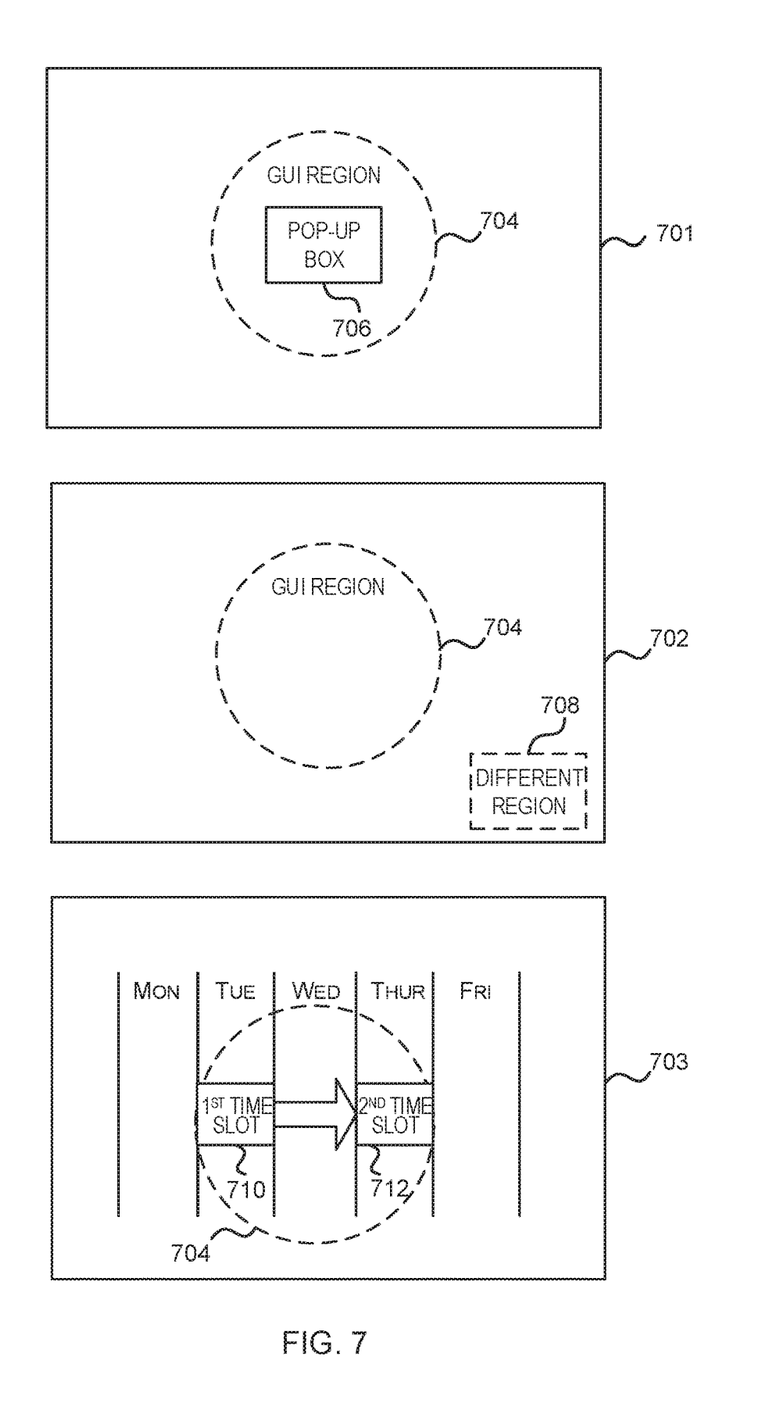
FIG. 7 shows three different examples of display changes within a graphical user interface.

Various examples of display changes are shown graphically in FIG. 7. In the first example 701, the attention tracking data indicates that a user is looking at a region 704 within the GUI and so if a user is required to notice a change (as specified by a parameter associated with the DCR), the change may be rendered within the region 704, for example in the form of a pop-up box 706. In the second example 702, the attention tracking data again indicates that a user is looking at a region 704 within the GUI and so if a change should be change-blind (as specified by a parameter associated with the DCR), the change may be rendered outside the region 704, for example in a different region 708 of the GUI.

As noted above, the parameters associated with a DCR may indicate that not only should a user be likely to notice the change but also that the nature of the change should be shown visually. In the third example 703, the change relates to a change in the time of an appointment in an electronic calendar from a first time slot 710 to a second time slot 712 (Which in this case is on a different day). In this example, the change may only be selected (in block 606) if the attention tracking data indicates that the user is looking at a region of the GUI 704 which covers the original appointment time and then, when rendering the change (in block 608 or as triggered in block 610), the transition from slot 710 to slot 712 is shown graphically (e.g. by an arrow or the appointment may appear to slide across the electronic calendar from the original time slot 710 to the new time slot 712).

As also noted above, in addition to (or instead of) specifying whether a change can be delayed, a time may be specified (within the parameters associated with the DCR) which is the latest time that the change can be displayed. Referring back to the third example 703 in FIG. 7, this particular DCR may, for example, have an associated parameter that indicates that it must be selected no later than one hour (or other time interval) before the original time slot 710.

In various examples, the parameters associated with a selected DCR may indicate whether user acknowledgement of the change is required. If a parameter associated with a selected DCR indicates that a user acknowledgement is required ('Yes' in block 612), then the attention tracking data may be analyzed to determine if such an acknowledgement is received ('Yes' in block 614). If no acknowledgement is received ('No' in block 614), the display change may be reversed (block 616) and the DCR may remain in the DCR store 106 until it is selected again (in block 606, as indicated by the dotted arrow from block 616 to block 606) or the display change may be rendered again (in block 608 or 610) without requiring it to be selected again first (e.g. as indicated by the dotted arrows from block 616 to blocks 608 and 610).

The determination of whether a user acknowledgement has been received (in block 614) is made based on attention tracking data and may, for example, be based on whether the user's attention location remains overlapping with the area of the GUI in which the change is rendered until after the change has been fully rendered (e.g. such that there is no acknowledgement received where the user looks away before the change has been fully rendered) or whether the user's attention remains on the change for a period of time after rendering or whether the user's attention tracks a dynamic change (e.g. moves to the right in the third example 703 shown icy FIG. 7). In various examples, if an acknowledgement is required an aspect of motion may be included within the display change that is rendered (e.g. a pop-up box 706 may move slightly within the GUI) and this motion of the rendered change may be correlated against any motion in the attention tracking data and used to indicate user acknowledgement of the change (e.g. if there is a correlation between the two). In other examples, motion in the attention tracking data may be correlated against the change made (even where the change is static) and used to indicate user acknowledgement of the change (e.g. if there is a correlation between the two). For example, if a line of text is changed, the attention tracking data may be analyzed to determine if the user scans over the new text and then this may be considered as an acknowledgement that the user has read (or at least seen) the changed text.

In various examples, a system may implement several different types of acknowledgement determination (e.g. one which provides more certainty that the user has seen the change, for example, by using correlation of motion and one which provides less certainly, for example, by just determining if the user was looking at the display when the change occurred) and the parameters associated with a DCR may specify the type (or standard) of acknowledgement determination for the change.

By using the acknowledgement mechanism (in block 614), the communication of the change to the user is confirmed and consequently an application 112 may rely upon the fact that the visual information has been delivered.

In various examples, an application which has submitted a DCR (as received in block 604) may stop running (e.g. enter a suspended state) until the display change has been rendered (in block 608 or as triggered in block 610). This reduces energy consumption and may also reduce memory usage (where the application is removed from memory in this period). Consequently at the time a change relating to an application 112 is rendered, the application 112 may not be running. Following the selection of a DCR (in block 606) and subsequent rendering of the display change specified in the DCR, a trigger may be sent to the application to cause it to re-start (block 618). In the event that the DCR required a user acknowledgement, this trigger may only be sent (in block 618) once user acknowledgement has been received ('Yes' in block 614).

In the examples described above, the stored DCR is selected (in block 606) based on attention tracking data, the parameters of the stored DCRs and in various examples on additional data, such as user identity. In various examples, however, the selection may be made based on user identity, user presence or any other type of user detection instead of attention tracking data.

In FIGS. 1-5, a computing device 124, 126, 402 may comprise one or more processors 116 which are microprocessors, controllers or any other suitable type of processors for processing computer executable instructions to control the operation of the device in order to implement the methods described herein. In some examples, for example where a system on a chip architecture is used, the processors 116 may include one or more fixed function blocks (also referred to as accelerators) which implement a part of the method of FIG. 6 in hardware (rather than software or firmware).

The computer executable instructions are provided using any computer-readable media that is accessible by a computing based device 124, 126, 402. Computer-readable media includes, for example, computer storage media such as memory 130, 132, 430 and communications media. Computer storage media, such as memory 130, 132, 430, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 130, 132, 430) is shown within the computing-based devices 124, 126, 402 it will be appreciated that the storage is, in some examples, distributed or located remotely and accessed via a network or other communication link (e.g. using communication interface 118).

The computing-based device 126, 402 also comprises an input/output controller 120 arranged to output display information to a display device (not shown in system 200 or display device 110 in system 300, 400) which may be separate from or integral to the computing-based device 126, 402. The display information may provide a graphical user interface. The input/output controller 126, 402 is also arranged to receive and process input from one or more devices, such as a user input device (e.g. a mouse, keyboard, camera, microphone or other sensor). In some examples the user input device (not shown in system 200, 300 or user input device 404 in system 400) detects voice input, user gestures or other user actions and provides a natural user interface (NUI). This user input may be used to interact with application software 112. In an embodiment the display device may also act as the user input device if it is a touch sensitive display device. The input/output controller 120 may outputs data to devices other than the display device in some examples, e.g. a locally connected printing device (not shown).

Any of the input/output controller 120, display device 110 and the user input device 404 may comprise NUI technology which enables a user to interact with the computing-based device in a natural manner, free from artificial constraints imposed by input devices such as mice, keyboards, remote controls and the like. The attention tracking system (comprising hardware 102 and software 104) comprises NUI technology. Examples of NUI technology that are provided in some examples include but are not limited to those retying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RCM) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Although the present examples are described and illustrated herein as being implemented in various example systems as shown in FIGS. 1-5, the systems described are provided as an example and not a limitation. As those skilled in the art wilt appreciate, the present examples are suitable for application in a variety of different types of distributed or stand-alone computing systems.

A first further example provides a system comprising: an input arranged to receive attention tracking data from attention tracking hardware; a processor; and a memory arranged to store pending display change requests and a display change control module comprising device-executable instructions, which when executed, cause the processor to receive display change requests from a plurality of applications, store the change requests in the memory, select a change request from those stored in the memory based on the attention tracking data and parameters associated with each change request and cause a change defined by the selected change request to be rendered in a GUI on a display device.

A second further example provides a system comprising: an input for receiving attention tracking data from a attention tracking system associated with a display device; a memory arranged to store display change requests and parameters associated with each stored display change request; and a centralized display change control module arranged to receive display change requests from a plurality of applications, store each received display change request in the memory, select a display change request from the stored display change requests based on the attention tracking data and parameters associated with each stored display change request, and render a display change defined by the selected display change request in a graphical user interface on the display device.

A second further example provides a system comprising: means for receiving attention tracking data from a attention tracking system associated with a display device; means for storing display change requests and parameters associated with each stored display change request; and a centralized display change control module arranged to receive display change requests from a plurality of applications, store each received display change request in the memory, select a display change request from the stored display change requests based on the attention tracking data and parameters associated with each stored display change request, and render a display change defined by the selected display change request in a graphical user interface on the display device.

In any of the first, second or third further examples, the memory may be further arranged to store a attention tracking module comprising device-executable instructions, which when executed, cause the processor to determine a user's attention location based on the attention tracking data, and wherein the display change control module comprises device-executable instructions, which when executed, cause the processor to select the change request from those stored in the memory based on the user's attention location and parameters associated with each change request.

The first, second or third further example may further comprise the attention tracking hardware.

The first, second or third further example may further comprise the display device. The display device may be a shared display device. The display device may be a persistent display device.

In the first, second or third further example, the display change control module may further comprise device-executable instructions, which when executed, cause the processor to determine, based on the parameters associated with the selected change request, if a user acknowledgement is required and in response to determining that a user acknowledgement is required, to determine whether a user acknowledgement has been received by analyzing the attention tracking data.

In the first, second or third further example, the display change control module may further comprise device-executable instructions, which when executed, cause the processor, in response to determining that a user acknowledgement has not been received, to reverse the rendering of the change defined by the selected change request in the GUI.

In the first, second or third further example, the display change control module may further comprise device-executable instructions, which when executed, cause the processor, in response to determining that a user acknowledgement has been received, to send a trigger to activate the application from which the selected change was received.

In the first, second or third further example, the display change control module may further comprise device-executable instructions, which when executed, cause the processor, after causing a change defined by the selected change request to be rendered in a GUI on the display device, to send a trigger to activate the application from which the selected change was received.

In the first, second or third further example, the display change control module may further comprise device-executable instructions, which when executed, cause the processor to select the display device on which to render the change from a plurality of display devices. The plurality of display devices may comprise display devices in a plurality of different user computing devices.

In the first, second or third further example, the change request may be selected based on the attention tracking data and parameters associated with each change request and user identity data.

In the first, second or third further example, the parameters associated with a change request may specify at least one of: Whether selection of the change request can be delayed, a manner in which the change request is to be displayed to a user, and whether user acknowledgment of the change request is required.

In the first, second or third further example, the display change control module may be at least partially implemented using hardware logic selected from any one or more of: a field-programmable gate array, a program-specific integrated circuit, a program-specific standard product, a system-on-a-chip, a complex programmable logic device.

A fourth further example provides method comprising: receiving, at a computing device, display change requests generated from a plurality of different applications and one or more parameters associated with each display change request; receiving attention tracking data from attention tracking hardware associated with a display device; selecting a display change request based on the attention tracking data and the parameters associated with each stored display change request; and causing a display change defined by the selected display change request to be rendered in a graphical user interface on the display device.

The method of the fourth further example may further comprise: determining, based on the parameters associated with the selected display change request, whether an acknowledgement by a user is required; and in response to determining that an acknowledgement is required, analyzing the attention tracking data to determine if a user acknowledgement is present.

The method of the fourth further example may further comprise at least one of: in response to determining that no user acknowledgement is present, causing the display change defined by the selected display change request to be reversed; in response to determining that a user acknowledgement is present, sending a trigger to wake the application from which the selected display change request was received.

The method of the fourth further example may be at least partially carried out using hardware logic.

In any of the four further examples, the attention tracking module may be a gaze tracking module and the attention tracking data may be gaze tracking data.

The examples illustrated and described herein as well as examples not specifically described herein but within the scope of aspects of the disclosure constitute exemplary means for controlling the rendering of display changes. For example, the elements illustrated in FIGS. 1-5, such as when encoded to perform the operations illustrated in FIG. 6, constitute exemplary means for selecting DCRs and causing DCRs to be rendered.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising:
an input device configured to receive attention tracking data from attention tracking hardware;
a processor; and
a memory arranged to store pending display change requests and a display change control module comprising device-executable instructions, which when executed, cause the processor to:
receive display change requests from a plurality of applications;
store the change requests in the memory;
select a change request from those stored in the memory based on the attention tracking data and parameters associated with each change request, wherein the parameters include a first time window parameter indicating a first time window for rendering a change defined in the selected change request;

identify one or more other change requests of the stored change requests that have a second time window indicating a second time for rendering one or more changes defined in the one or more other change requests, wherein the one or more other change requests is identified based on an overlap between the first time window and the second time window;

identify a plurality of screens of a display device;

based on the attention tracking data and parameters, determine a screen of the plurality of screens for rendering the change defined by the selected change request; and cause the change defined by the selected change request and the one or more other changes defined by the one or more other change requests to be rendered in a graphical user interface (GUI) on the determined screen of the display device, wherein determination of the screen is based at least in part on an attention position relative to members of the plurality of screens, and wherein the change defined by the selected change request and the one or more other changes defined by the one or more change requests are rendered as a group.

2. A system according to claim 1, wherein the memory is further arranged to store a attention tracking module comprising device-executable instructions, which when executed, cause the processor to determine a user's attention location based on the attention tracking data, and wherein the display change control module comprises device-executable instructions, which when executed, cause the processor to select the change request from those stored in the memory based on the user's attention location and parameters associated with each change request.

3. A system according to claim 1, further comprising the attention tracking hardware.

4. A system according to claim 1, further comprising the display device.

5. A system according to claim 1, wherein the display device is a shared display device.

6. A system according to claim 1, wherein the display device is a persistent display device.

7. A system according to claim 1, wherein the display change control module further comprises device-executable instructions, which when executed, cause the processor to determine, based on the parameters associated with the selected change request, if a user acknowledgement is required and in response to determining that a user acknowledgement is required, to determine whether a user acknowledgement has been received by analyzing the attention tracking data.

8. A system according to claim 7, wherein the display change control module further comprises device-executable instructions, which when executed, cause the processor, in response to determining that a user acknowledgement has not been received, to reverse the rendering of the change defined by the selected change request in the GUI.

9. A system according to claim 7, wherein the display change control module further comprises device-executable instructions, which when executed, cause the processor, in response to determining that a user acknowledgement has been received, to send a trigger to activate the application from which the selected change was received.

10. A system according to claim 1, wherein the display change control module further comprises device-executable instructions, which when executed, cause the processor, after causing a change defined by the selected change request to be rendered in a GUI on the display device, to send a trigger to activate the application from which the selected change was received.

11. A system according to claim 1, wherein the display change control module further comprises device-executable instructions, which when executed, cause the processor to select the display device on which to render the change from a plurality of display devices.

12. A system according to claim 11, wherein the plurality of display devices comprise display devices in a plurality of different user computing devices.

13. A system according to claim 1, wherein the change request is selected based on the attention tracking data and parameters associated with each change request and user identity data.

14. A system according to claim 1, wherein the parameters associated with a change request specify at least one of: whether selection of the change request can he delayed, a manner in which the change request is to be displayed to a user, and whether user acknowledgment of the change request is required.

15. A system as claimed in claim 1, wherein the display change control module is at least partially implemented using hardware logic selected from any one or more of: a field-programmable gate array, a program-specific integrated circuit, a program-specific standard product, a system-on-a-chip, a complex programmable logic device.

16. A method comprising:

receiving, at a computing device, display change requests generated from a plurality of different applications and one or more parameters associated with each display change request;

receiving attention tracking data from attention tracking hardware associated with a display device;

selecting a display change request based on the attention tracking data and the parameters associated with each stored display request, wherein the parameters include a first time window parameter indicating a first time window for rendering a change defined in the selected change request;

identifying one or more other change requests of the display change requests that have a second time window indicating a second time for rendering one or more changes defined in the one or more other change requests, wherein the one or more other change requests is identified based on an overlap between the first time window and the second time window;

identifying a plurality of screens of the display device, based on the attention tracking data and parameters;

determining a screen of the plurality of screens for rendering a display change defined by the selected change request, wherein determining the screen is based at least in part on an attention position relative to members of the plurality of screens; and causing the display change defined by the selected display change request and the one or more other changes defined by the one or more other change requests to be rendered in a graphical user interface (GUI) on the determined screen of the display device, wherein the change defined by the selected change request and the one or more other changes defined by the one or more other change requests are rendered as a group.

17. A method according to claim 16, further comprising:
determining, based on the parameters associated with the selected display change request, whether an acknowledgement by a user is required; and
in response to determining that an acknowledgement is required, analyzing the attention tracking data to determine if a user acknowledgement is present.

18. A method according to claim 17, further comprising at least one of:
in response to determining that no user acknowledgement is present, causing the display change defined by the selected display change request to be reversed; or
in response to determining that a user acknowledgement is present, sending a trigger to wake the application from which the selected display change request was received.

19. A method as claimed in claim 16 at least partially carried out using hardware logic.

20. A system comprising:
an input device configured to receive attention tracking data from an attention tracking system associated with a display device;
a memory device configured to store display change requests and parameters associated with each stored display change request; and
centralized display change control circuitry that causes at least one processor to:
receive display change requests from a plurality of applications;
store each received display change request in the memory;
select a display change request from the stored display change requests based on the attention tracking data and parameters associated with each stored display change request, wherein the parameters include a first time window parameter indicating a first time window for rendering a change defined in the selected change request
identify one or more other change requests of the stored change requests that have a second time window indicating a second time for rendering one or more changes defined in the one or more other change requests, wherein the one or more other change requests is identified based on an overlap between the first time window and the second time window;
identify a plurality of screens of the display device;
based on the attention tracking data and parameters, determine a screen of the plurality of screens for rendering a display change defined by the selected change request; and
render the display change defined by the selected display change request and the one or more other changes defined by the one or more other change requests in a graphical user interface (GUI) on the determined screen of the display device, wherein determination of the screen is based at least in part on an attention position relative to members of the plurality of screens, and wherein the change defined by the selected change request and the one or more other changes defined by the one or more other change requests are rendered as a group.

* * * * *